United States Patent Office 3,331,291
Patented July 18, 1967

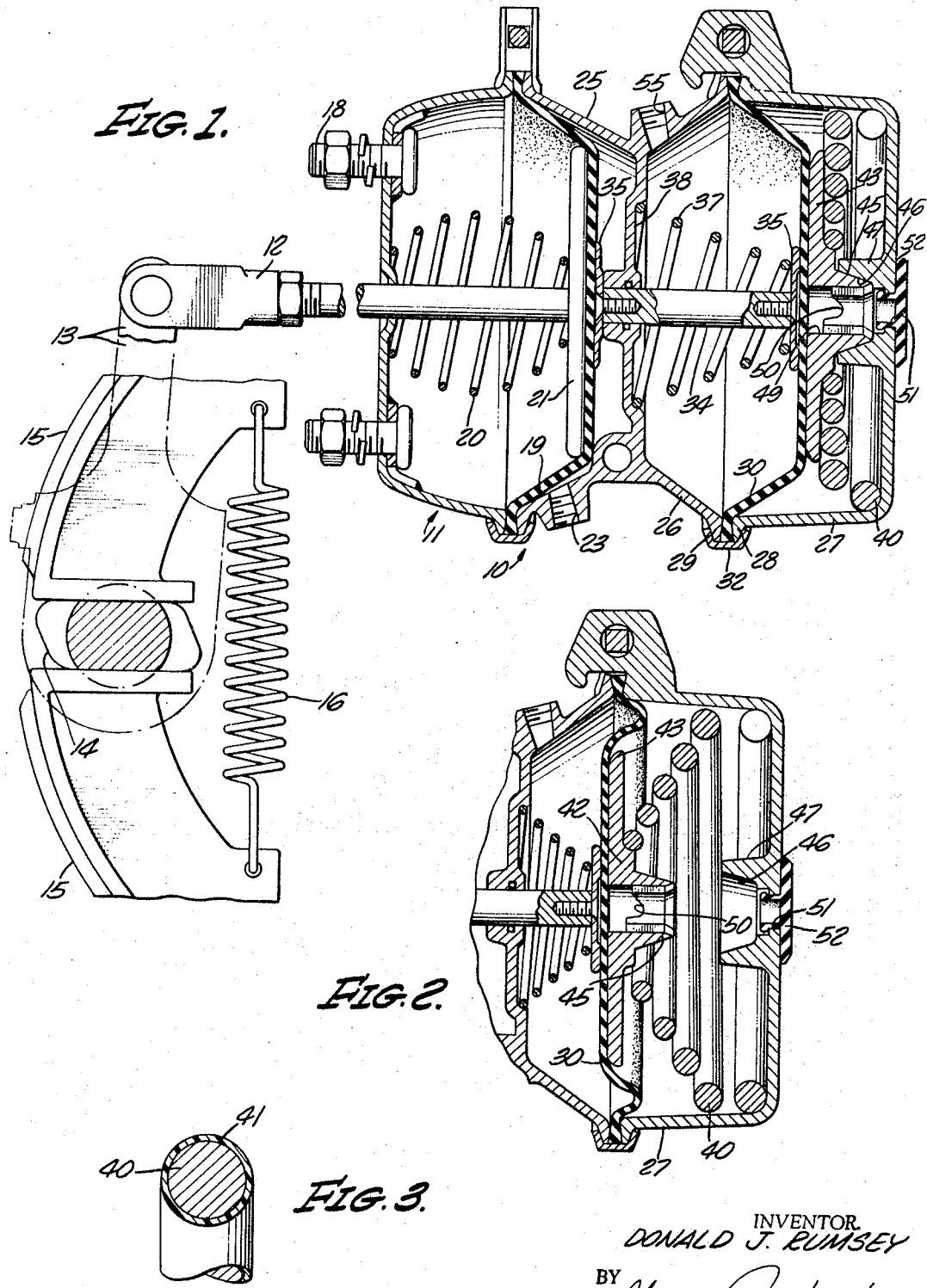

3,331,291
EMERGENCY BRAKE ACTUATOR
Donald J. Rumsey, Los Angeles, Calif., assignor to Royal Industries, Inc., Pasadena, Calif., a corporation of California
Filed July 15, 1965, Ser. No. 472,239
3 Claims. (Cl. 92—63)

This invention relates to braking systems and more particularly to an improved, more compact, lighter weight and more powerful emergency actuator useful in lieu of the customary pneumatically operated brake booster to set the brakes under certain contingencies and more particularly upon failure of some part of the pneumatic system.

Emergency actuators of the type to which the present invention relates are receiving serious consideration and are in wide use in combination with the pneumatic brake boosters for emergency use should the normal power braking system become unserviceable or unreliable for any reason. Such emergency actuators commonly utilize powerful mechanical spring means attached to the cover of the pneumatic booster and normally held fully cocked by means utilizing air pressure employed to operate the vehicle brakes and other auxilaries. The entire emergency actuator is supported outboard from the end of the booster and its size and weight add seriously to the strain and load forces normally acting on the booster structure itself.

Much effort has been made by designers with the objective of reducing the overall length and weight of the emergency actuator thereby reducing the load strains and stresses added to the booster and the brake operating linkage by the presence of this emergency braking device. One of the most effective means employed heretofore to reduce the weight and strain is disclosed in the copending application of Billy E. Stevenson and Don T. Ostgaard Ser. No. 448,558, filed Apr. 6, 1965 now Patent No. 3,291,004 and entitled Pneumatic Brake Setting Means with Emergency Mechanical Actuator Therefor. That application discloses an actuator in which very substantial reduction in weight and overal length are achieved through use of a barrel shaped emergency brake setting spring. The convolutions at the opposite ends of this spring are so arranged as to nest within one another under maximum loading thereby reducing the overall length, the weight and offering distinct advantages as respects spring power and rate characteristics. However the size and weight savings and other advantages are not as great as desired. Also the spring rate varies as the spring expands whereas it is desirable that the spring rate remain as nearly uniform as possible.

With the foregoing shortcomings and disadvantages of prior constructions in mind, it is an object of the present invention to provide an improved emergency actuator avoiding the foregoing and other disadvantages while providing a substantial reduction in overall size and in weight without sacrificing power available to set the brakes even under extremely adverse operating conditions.

To this end the present invention is characterized by the use of a helical emergency spring so designed that its convolutions nest to a maximum degree when fully activated or loaded and having a nearly constant spring rate through its installed operating range. A principal feature of the spring is the fact that it is formed from stock which tapers uniformly from its large diameter base end to its relatively small diameter output end. Its base end has a snug fit within the bottom of the enclosing housing and is maintained properly centered therein by this fit. The output end seats about a boss formed on a floating follower plate and cooperates therewith in supporting this follower centrally of a flexible diaphragm. The boss has a tapering surface and cooperates with a complementally shaped well formed centrally of the housing bottom in positively guiding the smaller diameter portion of the spring into a proper axial position while being collapsed to assure holding the individual convolutions of the spring out of contact with one another and avoiding the possibiilty of interference between these convolutions when expanding to set the brakes.

Another feature of the present invention is the provision of a protective plastic coating encasing the spring and serving to protect it from the elements.

Accordingly it is a primary object of the present invention to provide an improved lightweight and more compact, efficient and effective emergency actuator for braking systems.

Another object of the invention is the provision of an improved emergency actuator for braking systems utilizing a more compact and more powerful spring having a substantially uniform spring rate and occupying a minimum of space.

Another object of the invention is the provision of a rugged, lightweight, stronger and more powerful emergency actuator utilizing a helical spring formed from gradually tapering stock from its large diameter to its small diameter end.

Another object of the invention is the provision of an emergency actuator for braking systems utilizing a spring protected with a plastic covering and having substantially uniform power output throughout its operating range.

These and other more specific objects will appear upon reading the following specification and claims and upon considering in connection therewith the attached drawings to which they relate.

Referring now to the drawings in which a preferred embodiment of the invention is illustrated.

FIGURE 1 is a cross-sectional view through a brake booster and emergency actuator assembly according to a preferred embodiment of the present invention and showing the emergency spring unit fully compressed;

FIGURE 2 is a fragmentary view similar to FIGURE 1 but showing the emergency actuator spring expanded to hold the brake shoes in set position; and FIGURE 3 is an enlarged fragmentary cross-sectional view through the emergency spring.

Referring more particularly to FIGURE 1 there is shown a preferred embodiment of the invention, designated generally 10, and including a conventional type brake booster unit 11 having its actuating rod 12 connected to arm 13 of the brake setting cam shaft unit 14. This cam shaft operates in known manner to expand brake shoes 15, 15 against the brake drum (not shown). Normally the brake shoes are held retracted away from the drum by a tension spring 16.

Brake booster 11 is adapted to be rigidly anchored to a stationary part of the axle housing or other vehicle structure by the mounting bolts 18. The two-port booster housing encloses a flexible diaphragm 19 normally held in the retracted position shown in FIGURE 1 by a compression spring 20 bearing against a follower plate 21 fixed to the inner end of actuating rod 12. When pressurized air is admitted through supply duct 23, to the righthand side of diaphragm 19, rod 12 is shifted to the left rotating cam shaft arm 13 through a small arc to set brake shoes 15.

The compact emergency actuator is approximately the same size of booster 11 and is formed in part by the shallow cup 26 integral with booster cap 25 and a shallow cup-shaped end cap 27. This end cap or housing has outwardly flaring side walls provided with a flanged lip 28 cooperating with a similarly shaped lip 29 of housing member 26 to clamp therebetween the tapered peripheral edge of a high strength flexible diaphragm 30. This diaphragm is tightly clamped between lips 28 and 29 by a suitable clamping band 32 of any suitable construction well known in the art.

Suitable means for transmitting movement of diaphragm 30 to booster diaphragm 19 comprises a follower assembly 34 having wide area pads 35, 35 secured to its opposite ends and bearing against the adjacent surfaces of the two diaphragms when in the position shown in FIGURE 1. The stem of this follower unit passes through a fluidtight seal formed centrally of the booster end cap 25. Normally follower 34 is held pressed against the inner side of diaphragm 30 by a helical spring 37 capable of nesting within the confines of a shallow depression 38 formed centrally of the partition dividing the booster chamber from the emergency actuator chamber.

The powerful actuator spring 40 constituting a particularly important feature of the invention preferably has its largest diameter base convolution sized to fit snugly against the interior rim corner of housing 27. According to a preferred design and configuration, the spring is formed from uniformly tapering high tempered spring stock and all of the convolutions except the base convolution are sufficiently smaller in size as to nest one within the other when the spring is fully loaded in its retracted position shown in FIGURE 1. In a typically illustrated embodiment of the actuator as designed for use on heavy duty trucks the base end of spring 40 is formed of stock having a cross-sectional diameter of 0.535 inch whereas its smaller end is about 0.340 inch in diameter. When fully retracted to the position shown in FIGURE 1, this spring has an axial height of 1.125 inches and a fully expanded normal operating height of 3.875 inches at which time its load exerting force is approximately 1,400 pounds. At no position between its fully retracted and expanded positions does the spring exert less than 1,400 pounds nor substantially more than this amount, the taper of the stock and the convolution diameters being so selected and interrelated that its force exerting characteristics remain generally uniform over this entire movement range.

It will be understood that spring 40 is preferably fully encased with an impervious thin coating 41 of a tough plastic, such as a vinyl composition. This coating protects the spring against corrosion and other hazards.

The smaller diameter end of spring 40 nests over the base end of a low height boss 42 formed on the adjacent side of a floating follower plate 43 bearing against the outer face of diaphragm 30. Since the base end of spring 40 seats against the rim of the bottom of housing 27 and since the smaller end is nested over boss 42 of the follower the latter plate is held properly centered relative to the diaphragm at all times and there is no need for guide means, nor is there any risk of the follower plate becoming hung up on this non-existent guide means as sometimes occurs in prior art designs.

A further feature of follower plate 43 is the provision of a tapering boss 45 projecting within the spring and cooperating with the complementally shaped surface 46 of a boss 47 cast integral with the bottom of housing 27. Accordingly if the follower should become slightly displaced from its central position when in expanded position it is automatically recentered during the next retraction movement of spring 40. This centering action, as will be readily recognized from the drawing, occurs automatically as the spring approaches its fully nested position.

The center of boss 45 on the follower member is provided with a well 49 having a bayonet type female notch 50 to seat cross pin extending through the end of a lockout bolt, not shown, but of a type well known in this art and insertable through opening 51 in the bottom of housing 27. This opening is normally closed by a removable rubber plug 52. The lockout bolt has a threaded shank provided with a nut exteriorly of housing 27, which can be tightened after the lockout bolt has been assembled within notches 50 and used to compress the spring when no air pressure is available for this purpose. Since this bolt is not a part of this invention, further description and illustration will not be necessary.

In the normal operation of the described braking facility pressurized air is supplied through inlet opening 55 in housing 26 causing diaphragm 30 and follower plate 43 to be pressed to the right as viewed in FIGURE 1 until actuator spring 40 is fully retracted, and energized. Normally the air pressure retains the actuator in this energized position and the brake booster is used in conventional manner to operate the brakes in accordance with operating needs. However should the pneumatic pressure become excessively low, or fail for any reason, the pressurized air is released from the actuator chamber thereby releasing emergency spring 40 which expands and shifts follower 34, booster diaphragm 19 and rod 12 to the left as viewed in FIGURE 1 against booster diaphragm 19 and follower 21 to operate the push rod and setting the vehicle brakes and maintaining them set under the powerful action of spring 40. The brakes remain fully set so long as the actuator spring is allowed to remain in its expanded condition and can be released only by readmitting pressurized air through supply opening 55 or by using the lockout bolt, not shown, as described above to retract spring 40.

While the particular emergency brake actuator herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. In combination, an emergency actuator and brake booster assembly having a pair of substantially equal sized housings arranged end-to-end and having a common dividing wall therebetween and each divided by a separate flexible diaphragm, follower means having a fluidtight sliding fit through said common wall with its opposite ends normally bearing against the adjacent face of a respective one of said diaphragms, said actuator housing a shallow cup-shaped cover having an outwardly flaring side wall, a powerful helical spring formed of stock tapering from a maximum size at the base thereof to a minimum size at its smaller end and having all except its largest convolution thereof sized to nest into a common plane, said largest convolution having a close fit with the interior bottom end of said cup-shaped cover and serving to position said spring axially of said emergency actuator, a floating follower and bearing plate member interposed between the emergency diaphragm and the smaller end of said helical spring and including boss means thereon extending into the smaller end of the spring, said boss on said follower plate member has a frusto-conical surface thereon nestable with the complementally shaped surface of a boss positioned centrally of the interior bottom portion of the cup-shaped cover for said emergency actuator and cooperating with one another to center said floating follower plate member axially of the actuator housing as said helical spring approaches full compression, and separate air supply ports extending into said housing on the opposite sides of said common wall for applying pressure to the associated one of said diaphragms.

2. The combination defined in claim 1 characterized in that said helical spring has a thin covering of an impervious plastic thereon.

3. An emergency actuator subassembly for use with a brake booster assembly, said subassembly having a housing, a flexible diaphragm mounted crosswise of said housing, follower means having a fluid-tight sliding fit through said housing for operating the brake booster assembly and with its opposite end extending into said housing for normally bearing against the adjacent face of said diaphragm, said actuator housing having a cup-shaped cover having a boss positioned on the interior portion thereof, a powerful helical spring formed of a stock tapering from a maximum size at the base thereof to a minimum size at its smaller end and having all except its largest convolution thereof sized to nest into a common plane, said largest convolution having a close fit with the interior end of said cup-shaped cover and serving to position said spring axially of said housing, a floating follower and bearing plate member interposed between the diaphragm and the smaller end of said helical spring and including boss means having a frusto-conical surface thereon extending into the smaller end of the spring, said follower frusto-conical surface and said cover boss being complementally shaped relative to one another to allow them to nest and coact with one another to center said floating follower plate member axially of the housing as said spring approaches full compression, and a fluid supply port extending into said housing for applying fluid pressure to said diaphragm.

References Cited

UNITED STATES PATENTS

| | | | |
|---|---|---|---|
| 170,973 | 12/1875 | Tyler | 267—1 |
| 485,652 | 11/1892 | Pfingst | 267—61 |
| 1,031,763 | 7/1912 | Woodland | 267—1 |
| 2,524,293 | 10/1950 | Lindstrom | 267—1 |
| 2,625,954 | 1/1953 | Klein | 92—94 X |
| 3,020,094 | 2/1962 | Murty et al. | 92—63 X |
| 3,127,818 | 4/1964 | Cruse | 92—63 |
| 3,177,984 | 4/1965 | Taylor | 92—132 X |
| 3,291,004 | 12/1966 | Stevenson et al. | 92—63 |

FOREIGN PATENTS 378,950  8/1923  Germany.

OTHER REFERENCES

Berry, W. R.: Spring Design. London, Emmott and Company Limited, 1961. Pp. 122–129.

MARTIN P. SCHWADRON, *Primary Examiner.*

I. C. COHEN, *Assistant Examiner.*